US011119365B2

(12) United States Patent
Toko

(10) Patent No.: US 11,119,365 B2
(45) Date of Patent: Sep. 14, 2021

(54) LIQUID CRYSTAL ELEMENT, LIGHTING APPARATUS

(71) Applicant: STANLEY ELECTRIC CO., LTD., Tokyo (JP)

(72) Inventor: Yasuo Toko, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/669,547

(22) Filed: Oct. 31, 2019

(65) Prior Publication Data

US 2020/0142263 A1    May 7, 2020

(30) Foreign Application Priority Data

Nov. 2, 2018  (JP) .............................. JP2018-207414

(51) Int. Cl.
*G02F 1/1343*   (2006.01)
*G02F 1/1362*   (2006.01)
*G02F 1/1335*   (2006.01)

(52) U.S. Cl.
CPC .. *G02F 1/134309* (2013.01); *G02F 1/133512* (2013.01); *G02F 1/136286* (2013.01)

(58) Field of Classification Search
CPC ................. G02F 1/1339; G02F 1/0107; G02F 2001/13396; G02F 1/136286; G02F 1/1368; G02F 2001/136295; G02F 1/1343; G02F 1/136295; H01J 9/242; H01J 11/36; H01J 2211/36; H01J 2217/49271; F21S 41/645; F21S 41/153; F21S 41/255; F21S 41/143

See application file for complete search history.

(56) References Cited

U.S. PATENT DOCUMENTS

2009/0103021 A1    4/2009  Manabe et al.
2009/0185094 A1*   7/2009  Lee ..................... G02F 1/13394
                                                                349/46

(Continued)

FOREIGN PATENT DOCUMENTS

EP    3 505 817         7/2019
JP    2005-183327 A     7/2005

OTHER PUBLICATIONS

European Search Report dated Feb. 10, 2020 in European Patent Application No. 19205739.6, 9 pages.

*Primary Examiner* — Mariam Qureshi
(74) *Attorney, Agent, or Firm* — Xsensus LLP

(57) ABSTRACT

To improve the appearance of a light distribution pattern. A liquid crystal element including: a first substrate; a second substrate; a liquid crystal layer; and columnar bodies; where the first substrate has a counter electrode provided on its one surface side; where the second substrate is configured to include wiring parts provided on its one surface side, an insulating layer provided on the upper side of the wiring parts, and pixel electrodes provided on the upper side of the insulating layer; where the pixel electrodes are arranged along a first direction; where each wiring part is connected to one of the pixel electrodes, arranged on the lower layer side of the pixel electrodes, and has a connection region that passes through a gap between the pixel electrodes adjacent to each other in the first direction; and where the columnar bodies is provided at a position overlapping the connection region.

10 Claims, 11 Drawing Sheets

(56) References Cited

U.S. PATENT DOCUMENTS

| | | | |
|---|---|---|---|
| 2013/0176515 A1* | 7/2013 | Chang | G02F 1/1368 |
| | | | 349/43 |
| 2016/0077402 A1* | 3/2016 | Takehara | G02F 1/1337 |
| | | | 349/33 |
| 2018/0138214 A1* | 5/2018 | Lee | G02F 1/133514 |

* cited by examiner

LIQUID CRYSTAL ELEMENT, LIGHTING APPARATUS

CROSS-REFERENCE TO RELATED APPLICATION

The present application claims priority to JP 2018-207414, filed Nov. 2, 2018, the entire contents of which are incorporated herein by reference.

BACKGROUND OF THE INVENTION

Field of the Invention

The present invention relates to an apparatus and a system for performing light irradiation in a desired pattern in front of an own vehicle for example, and a liquid crystal element suitable for use in the apparatus and the system.

Description of the Background Art

Japanese Unexamined Patent Application Publication No. 2005-183327 discloses a vehicular lamp comprising a light emitting part 11 including at least one LED 11a and a light shielding part 12 where a part of the light irradiated forward from the light emitting part is shielded forming a cutoff line suited for a light distribution pattern of the vehicular lamp. The light shielding part 12 consists of an electro-optical element having a dimming function and a control part 14 which performs light dimming control of the electro-optical element. The control part selectively performs a light dimming control by electrically switching the electro-optical element, thereby changing the shape of the light distribution pattern. A liquid crystal element is used as the electro-optical element, for example.

In the vehicular lamp as described above, the electro-optical element such as a liquid crystal element or the like is configured to have a plurality of pixel electrodes in order to achieve selective dimming. These pixel electrodes are separated from one another so as to be able to apply voltages individually, and a gap is provided between each of the pixel electrodes for electrical insulation. Here, the gap between the pixel electrodes is approximately 10 μm although it varies depending on the required forming precision. Further, in the case where three or more rows of pixel electrodes are provided, since it is necessary to extend a wiring part between the pixel electrodes for applying voltage to each pixel electrode in the middle row, the gap between the pixel electrodes eventually becomes larger. The gap between the pixel electrodes is a portion that does not contribute to the image formation and becomes a factor for generating a dark line in the light distribution pattern. In a vehicular lamp, since the image formed by the electro-optical element (the image corresponding to the light distribution pattern) is enlarged by the lens or the like and projected to the front of the own vehicle, the dark line as described above is also enlarged causing it to become conspicuous, thereby resulting in poor appearance in the light distribution pattern which is a disadvantage.

To overcome this disadvantage, narrowing the gap between the pixel electrodes may be considered. However, this option is not preferable because this would increase manufacturing cost and is likely to cause troubles such as a short circuit between the pixel electrodes. Further, to overcome this disadvantage, thinning the wiring part extended between the pixel electrodes may be considered. However, this option is not preferable because the increase in the resistance of the wiring part makes it difficult to apply necessary and sufficient voltage to the pixel electrode and disconnection occurrence probability increases due to the thinning of the wiring part. Here, such disadvantages are not limited to a vehicle lamp and is likely to occur in a general lighting apparatus that controls light distribution patterns using a liquid crystal element or the like.

In a specific aspect, it is an object of the present invention to provide a technique capable of improving the appearance of a light distribution pattern in a lighting apparatus that controls the light distribution pattern using liquid crystal elements or the like.

SUMMARY OF THE INVENTION

[1] A liquid crystal element according to one aspect of the present invention includes: (a) a first substrate and a second substrate disposed facing each other; (b) a liquid crystal layer disposed between the first substrate and the second substrate; and (c) a plurality of columnar bodies arranged between the first substrate and the second substrate and disposed in the liquid crystal layer; where (d) the first substrate has a counter electrode provided on its one surface side; where (e) the second substrate is configured to include a plurality of wiring parts provided on its one surface side, an insulating layer provided on the upper side of the plurality of wiring parts, and a plurality of pixel electrodes provided on the upper side of the insulating layer; where (f) the plurality of pixel electrodes is arranged at least along a first direction in a plan view; where (g) each of the plurality of wiring parts is connected to one of the plurality of pixel electrodes, arranged on the lower layer side of the plurality of pixel electrodes, and has a connection region that passes through a gap between the pixel electrodes adjacent to each other in the first direction; and where (h) the plurality of columnar bodies is provided at least at a position overlapping the connection region in a plan view.

[2] A liquid crystal element according to one aspect of the present invention includes: (a) a first substrate and a second substrate disposed facing each other; (b) a liquid crystal layer disposed between the first substrate and the second substrate; and (c) a plurality of columnar bodies arranged between the first substrate and the second substrate and disposed in the liquid crystal layer; where (d) the first substrate has a counter electrode provided on its one surface side; where (e) the second substrate is configured to include a plurality of wiring parts provided on its one surface side, an insulating layer provided on the upper side of the plurality of wiring parts, and a plurality of pixel electrodes provided on the upper side of the insulating layer; where (f) the plurality of pixel electrodes is arranged at least along the first direction in a plan view; where (g) each of the plurality of wiring parts is connected to one of the plurality of pixel electrodes and arranged on the lower layer side of the plurality of pixel electrodes; where (h) the plurality of pixel electrodes is configured to include at least a first pixel electrode arranged along the first direction, a second pixel electrode adjacent to the first pixel electrode, and a third pixel electrode adjacent to the second pixel electrode; where (i) the plurality of wiring parts is configured to include a first wiring part connected to the first pixel electrode, a second wiring part connected to the second pixel electrode, and a third wiring part connected to the third pixel electrode; where (j) the third wiring part is configured to include a connection region disposed between the first pixel electrode and the second pixel electrode in a plan view; and where (k)

the plurality of columnar bodies is provided at least at a position overlapping the connection region in a plan view.

According to each of the configurations described above, it is possible to improve the appearance of a light distribution pattern in a lighting apparatus that controls the light distribution pattern using liquid crystal elements or the like.

DESCRIPTION OF THE PREFERRED EMBODIMENTS

Figure 1:
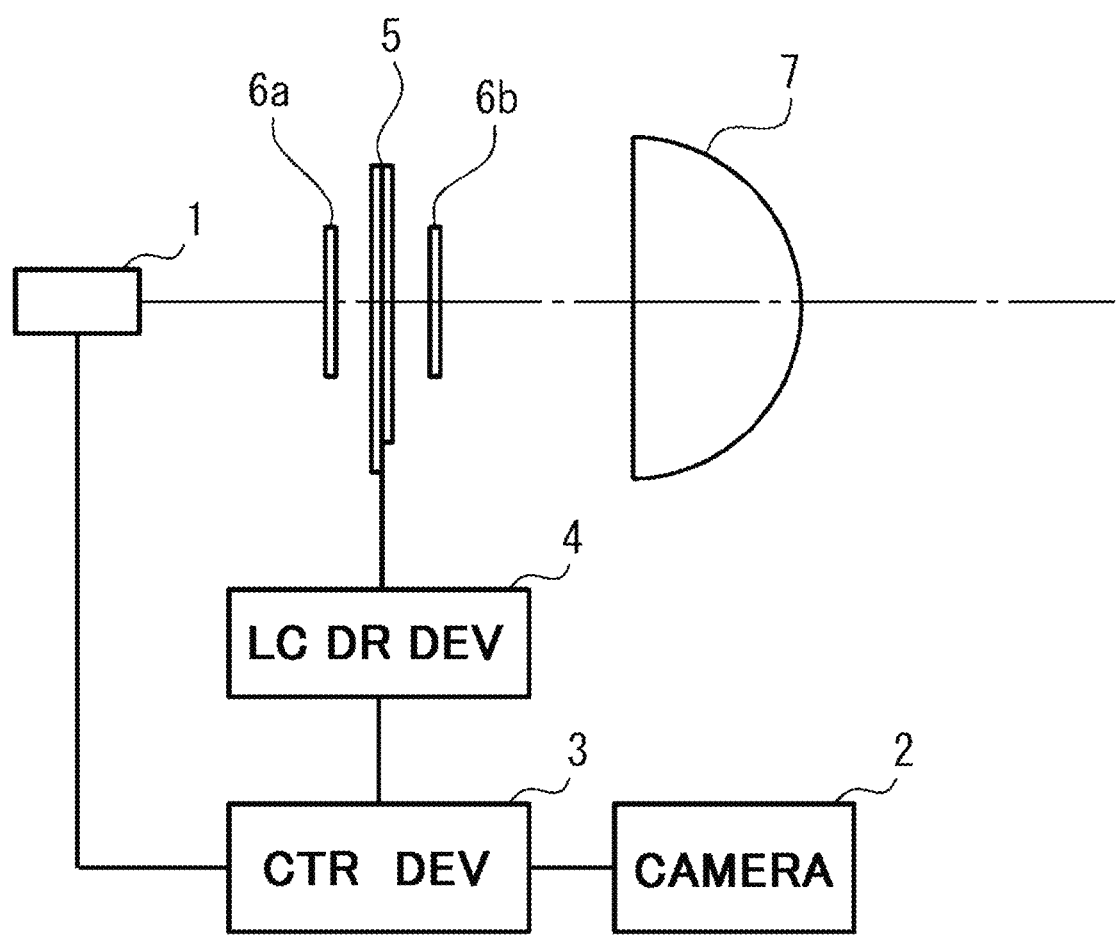
FIG. 1 is a diagram showing the configuration of a vehicular lamp system according to one embodiment.

FIG. 1 is a diagram showing the configuration of a vehicular lamp system according to one embodiment. The vehicular lamp system shown in FIG. 1 is configured to include a light source 1, a camera 2, a control device 3 (which is abbreviated as CTR DEV in FIG. 1), a liquid crystal driving device 4 (which is abbreviated as LC DR DEV in FIG. 1), a liquid crystal element 5, a pair of polarizers 6a and 6b, and a projection lens 7. The vehicular lamp system detects the position of a preceding vehicle or a pedestrian or the like existing around one's own vehicle based on the image captured by the camera 2, sets a predetermined region including the position of a preceding vehicle or the like as the non-irradiation region, and sets the remaining region as the light irradiation region and selectively irradiates light thereafter.

The light source 1 includes, for example, a white light LED configured by combining a yellow phosphor in a light emitting element (LED) that emits blue light. The light source 1 includes, for example, a plurality of white light LED arranged in a matrix or in a line. Here, instead of the above-stated LED, light source commonly used in a lamp unit for vehicles such as a laser, a light bulb or a discharge lamp can be used for the light source 1. The on/off state of the light source 1 is controlled by a control device 3. The light emitted from the light source 1 is made incident on the liquid crystal element 5 (the liquid crystal panel) via the polarizer 6a. Note that another optical system, for example, a lens, a reflecting mirror, or a combination thereof, may exist on the path from the light source 1 to the liquid crystal element 5.

The camera 2 is for photographing the front of its own vehicle and outputting its image (information), and is installed at a predetermined position (for example, the upper portion of the front windshield) inside the vehicle. Here, note that if the own vehicle is equipped with a camera for other purposes (for example, an automatic braking system or the like), the camera may be shared.

The control device 3 detects the position of the forward vehicle or the like by performing image processing based on the image obtained by the camera 2 photographing the front of the vehicle. The control device 3 then sets a light distribution pattern where the the position (area) of the detected forward vehicle or the like is defined as the non-irradiation range and the remaining area is defined as the irradiation range. The control device 3 then generates a control signal for forming an image corresponding to the light distribution pattern and supplies it to the liquid crystal driving device 4. The control device 3 carries out a predetermined operation program in a computer system comprising a CPU, a ROM, a RAM and the like, for example.

The liquid crystal driving device 4 supplies a driving voltage to the liquid crystal element 5 based on the control signal supplied from the control device 3, thereby individually controlling the alignment state of the liquid crystal layer in each pixel region of the liquid crystal element 5.

The liquid crystal element 5 has, for example, a plurality of individually controllable pixel regions (light modulating regions), and the transmittance of each pixel region is variably set according to the magnitude of the voltage applied to the liquid crystal layer provided by the liquid crystal driving device 4. By transmitting light from the light source 1 to the liquid crystal element 5, the image having brightness and darkness corresponding to the light irradiation range and the non-irradiation range described above is formed. For example, the liquid crystal element 5 is provided with a vertical alignment type liquid crystal layer and is disposed between the pair of polarizers 6a and 6b arranged in crossed Nicol arrangement. The liquid crystal element 5 is set in a state in which the light transmittance is extremely low (light shielding state) when the voltage to the liquid crystal layer is not applied (or a voltage is equal to or lower than a threshold value) and is set in a state in which the light transmittance is relatively high (transmission state) when the voltage is applied to the liquid crystal layer.

The polarizing axes of the pair of polarizers 6a and 6b are substantially orthogonal to each other, for example, and are arranged to face each other with the liquid crystal element 5 interposed therebetween. In this embodiment, the liquid crystal element is assumed to be set in a state where light is shielded (the light transmittance is extremely low) when no voltage is applied to the liquid crystal layer, which is so-called a normally black mode type liquid crystal element. As for each of the polarizers 6a and 6b, an absorptive polarizer made of a general organic material (iodine type, dye type) can be used, for example. Further, if heat resistance is highly desired, it is also preferable to use a wire grid polarizer. A wire grid polarizer is a polarizer in which ultra thin lines (wires) made of metal such as aluminum are arranged in an array. Further, an absorptive polarizer and a wire grid polarizer may be stacked and used.

The projection lens 7 enlarges the image formed by the light transmitted through the liquid crystal element 5 (the image having bright and dark portions each corresponding to the light irradiation range and the non-irradiation range) so as to provide light distribution suited for a headlight and projects the image forward of the own vehicle, and a suitably designed lens is used in the system to achieve its purpose. In this embodiment, a projector lens which forms an inverted image is used.

Figure 2A:
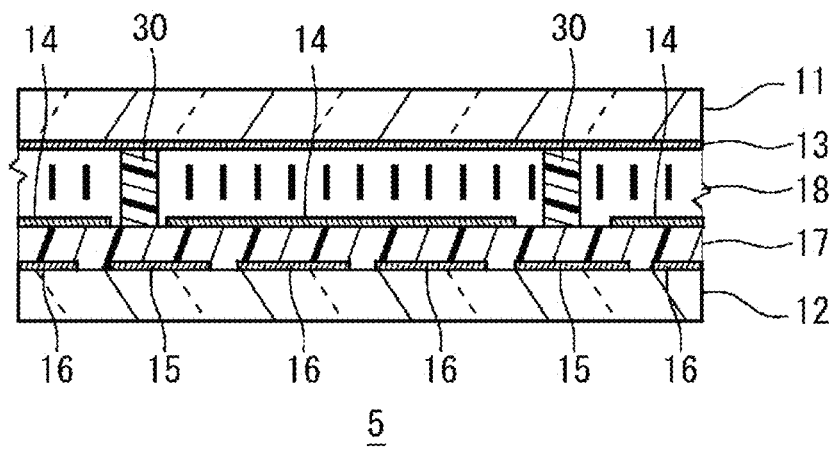
FIGS. 2A to 2C are schematic cross-sectional views showing the configuration of the liquid crystal element.
Figure 2B:
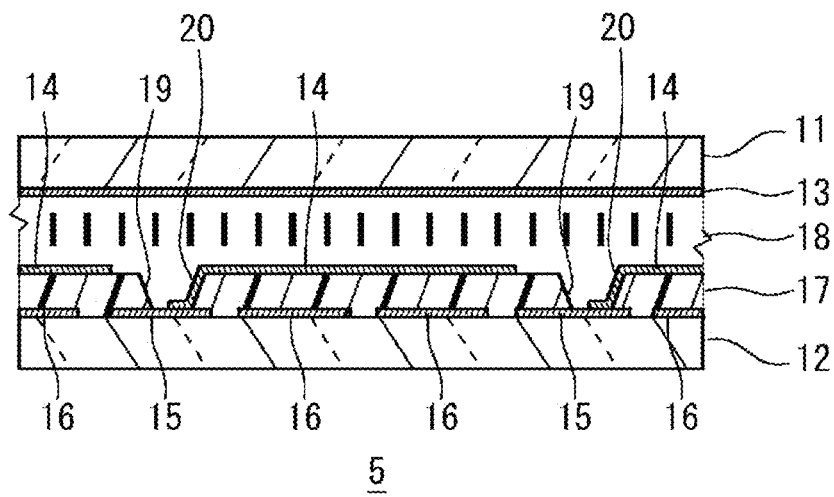
Figure 2C:
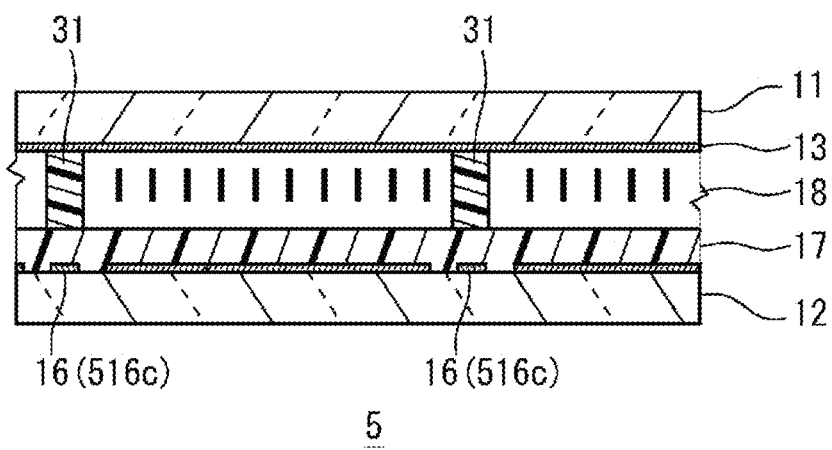
Figure 3:
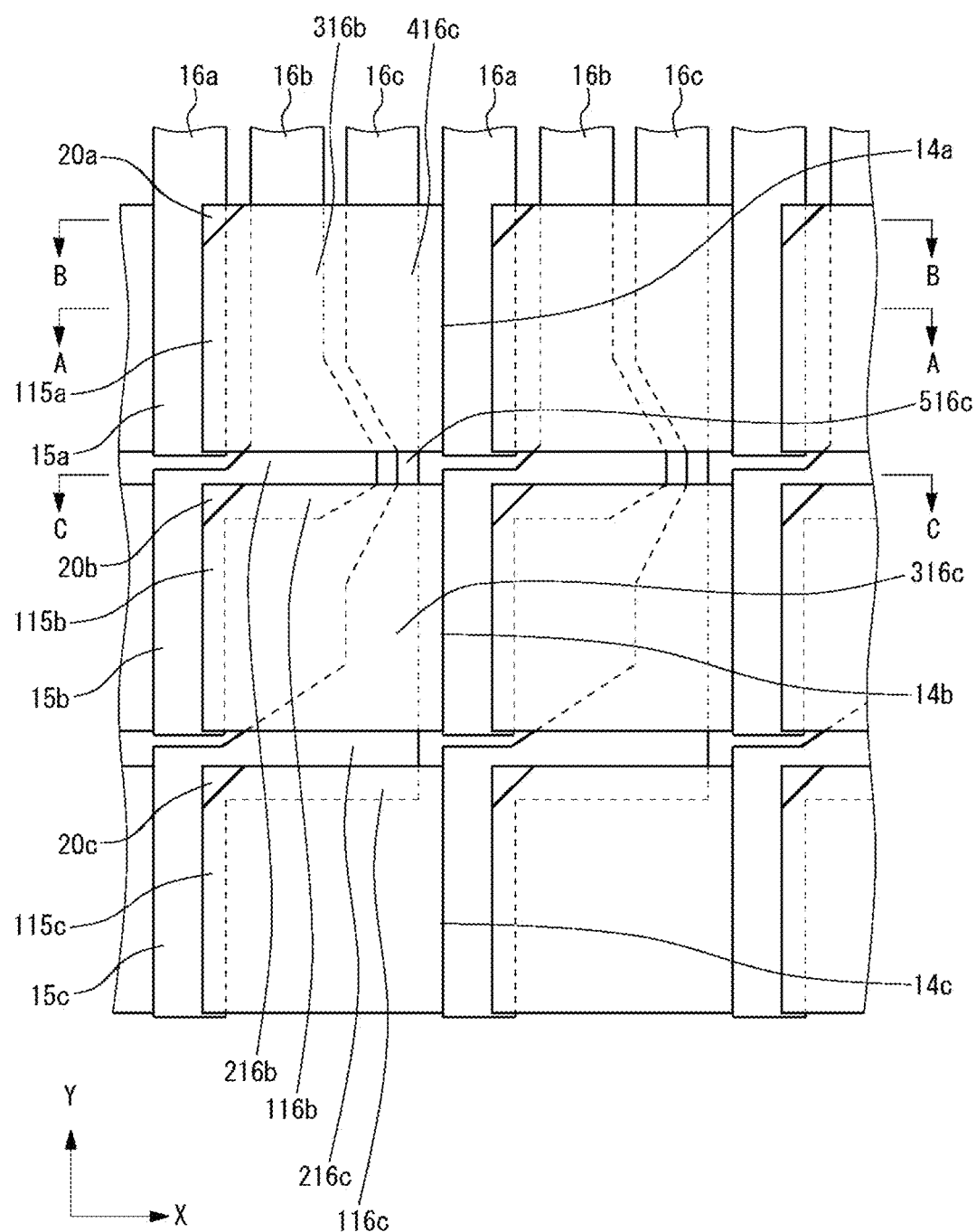
FIG. 3 is a schematic plan view showing the configuration of the liquid crystal element.

FIGS. 2A to 2C are schematic cross-sectional views showing the configuration of the liquid crystal element. And FIG. 3 is a schematic plan view showing the configuration of the liquid crystal element. Here, the cross sectional view shown in FIG. 2A corresponds to the partial cross section taken along line A-A shown in FIG. 3, and the cross sectional view shown in FIG. 2B corresponds to the partial cross section taken along line B-B shown in FIG. 3, and the cross sectional view shown in FIG. 2C corresponds to the partial cross section taken along line C-C shown in FIG. 3. The liquid crystal element 5 is configured to include an upper substrate (a first substrate) 11 and a lower substrate (a second substrate) 12 arranged to face each other, a common electrode (a counter electrode) 13 provided on the upper substrate 11, a plurality of pixel electrodes 14 (14a, 14b, 14c) provided on the lower substrate 12, a plurality of inter-pixel electrodes 15 (15a, 15b, 15c), a plurality of wiring parts 16 (16a, 16b, 16C), an insulating layer 17, and a liquid crystal layer 18 disposed between the upper substrate 11 and the lower substrate 12. Here, although not shown for convenience of explanation, an alignment film for regulating the alignment of the liquid crystal layer 18 is suitably provided on the upper substrate 11 and the lower substrate 12, respectively.

Each of the upper substrate 11 and the lower substrate 12 is a rectangular substrate in a plan view and are arranged to face each other. As for each substrate, for example, a transparent substrate such as a glass substrate, a plastic substrate or the like can be used. A plurality of columnar spacers (columnar bodies) 30, 31 made of, for example, a resin film is dispersedly arranged between the upper substrate 11 and the lower substrate 12, and as a result of these spacers 30, 31, a predetermined gap (approximately a few µm, for example) is maintained between the two substrates.

In the present embodiment, as shown in FIG. 2A, for example, each columnar spacer 30 is provided between the adjacent pixel electrodes 14 (pixel electrodes 14 adjacent in the X direction as shown in FIG. 3) and overlaps the inter-pixel wiring 15 in a plan view. The size of each columnar spacer 30 is, for example, preferably set to a diameter of about 10 µm to 30 µm, and is most preferable to set to about 20 µm from the optical viewpoint and from the viewpoint of capability to maintain the substrates at a prescribed gap. The shape of each columnar spacer 30 in a plan view can be a circular shape, a rectangular shape, or the like.

Further, in this embodiment, as shown in FIG. 2C, for example, each columnar spacer 31 is provided between the adjacent pixel electrodes 14 (pixel electrodes 14 adjacent in the Y direction as shown in FIG. 3) and overlaps the partial region (partial region 516c to be described later) of each wiring part 16 in a plan view. The size of each columnar spacer 31 is, for example, preferably set to a diameter of about 10 µm to 30 µm, and is most preferable to set to about 20 µm from the optical viewpoint and from the viewpoint of capability to maintain the substrates at a prescribed gap. Further, in relation to the partial region 516c, it is preferable that each columnar spacer 31 is provided so as to overlap with all of the partial regions 516c. Considering the alignment accuracy of the first substrate 11 and the second substrate 12, it is preferable that the respective lengths of the columnar spacers 31 in the X direction and Y direction in a plan view are several µm (for example, 5 µm) larger than the lengths of the partial region 516c.

Here, each of the columnar spacers 30, 31 can be collectively formed by performing a conventional photoresist process using, for example, a photocurable resin. Each of the columnar spacers 30, 31 may be formed on one surface side of the first substrate 11, or may be formed on one surface side of the second substrate 12. From the viewpoint of alignment accuracy, each of the columnar spacers 30, 31 is preferably provided on the second substrate 12. On the other hand, from the viewpoint of ease of manufacture, each of the columnar spacers 30, 31 is preferably provided on the first substrate 11. In this case, each of the columnar spacer 30, 31 (particularly each of the columnar spacers 31) is preferably formed in a size somewhat larger than the preferred size described above. Further, each of the columnar spacers 30, 31 may be transparent (having translucency), or may be a dark color (having light shielding properties) such as black, for example. The color of the columnar spacers 30, 31 can be appropriately selected depending on the operation mode of the liquid crystal layer 18 or the alignment state of the polarization axes of each of the polarizers 6a, 6b.

The common electrode 13 is provided on one surface side of the upper substrate 11. The common electrode 13 is integrally provided so as to face each pixel electrode 14 of the lower substrate 12. The common electrode 13 is configured, for example, by suitably patterning a transparent conductive film made of indium tin oxide (ITO) or the like.

The plurality of pixel electrodes 14 (14a, 14b, 14c) is provided on one surface side of the lower substrate 12 and on the upper side of the insulating layer 17. These pixel electrodes 14 (14a, 14b, 14c) are configured, for example, by suitably patterning a transparent conductive films made of indium tin oxide (ITO) or the like. As shown in FIG. 3, each pixel electrode 14 has, for example, a rectangular outer edge shape in a plan view, and is arranged in a matrix along the X direction and the Y direction. A gap is provided between each pixel electrode 14. Each of the regions where the common electrode 13 and each pixel electrode 14 overlap constitutes the above-described pixel region (light modulation region).

The plurality of inter-pixel electrodes 15 (15a, 15b, 15c) is provided on one surface side of the lower substrate 12 and on the lower layer side of the insulating layer 17. These inter-pixel electrodes 15 (15a, 15b, 15c) are configured, for example, by suitably patterning a transparent conductive films made of indium tin oxide (ITO) or the like. As shown in FIG. 3, each of the inter-pixel electrode 15 (15a, 15b, 15c) has, for example, a rectangular outer edge shape in a plan view and overlaps the gap between the two pixel electrodes 14 (14a, 14b, 14c) adjacent to each other in the X direction in the figure.

The plurality of wiring parts 16 (16a, 16b, 16C) is provided on one surface side of the lower substrate 12 and on the lower layer side of the insulating layer 17. These wiring parts 16 (16a, 16b, 16C) are configured, for example, by suitably patterning a transparent conductive films made of indium tin oxide (ITO) or the like. A voltage is applied from the liquid crystal driving device 4 to each of the pixel electrodes 14 (14a, 14b, 14c) via each of the wiring parts 16 (16a, 16b, 16C).

The insulating layer 17 is provided on one surface side of the lower substrate 12 so as to cover the upper side of the inter-pixel electrodes 15 (15a, 15b, 15c) and the wiring parts 16 (16a, 16b, 16C). The insulating layer 17 is, for example, a $SiO_2$ film or a SiON film and can be formed by a gas phase process such as a sputtering method or a solution process. An organic insulating film may also be used for the insulating layer 17.

The liquid crystal layer 18 is provided between the upper substrate 11 and the lower substrate 12. In the present embodiment, the liquid crystal layer 18 is formed using a nematic liquid crystal material having a negative dielectric anisotropy Δε, including a chiral material and having fluidity. In the liquid crystal layer 18 of this embodiment, the alignment of the liquid crystal molecules when no voltage is applied is in a state inclined in one direction, and has a pretilt angle within the range of 88° or more and less than 90° with respect to each substrate surface and is set so that the liquid crystal molecules are substantially vertically aligned, for example.

As described above, an alignment film is provided on one surface side of the upper substrate 11 and the lower substrate 12, respectively. As each of the alignment films, a vertical alignment film that regulates the alignment of the liquid crystal layer 18 vertically is used. Each alignment film is subjected to a uniaxial alignment treatment such as a rubbing treatment and has a uniaxial alignment regulating force that regulates the alignment of the liquid crystal molecules of the liquid crystal layer 18 in one direction. The alignment treatment direction of the respective alignment films is set so as to be staggered (anti-parallel), for example.

The liquid crystal element 5 of the present embodiment has several tens of pixel regions to several hundreds of pixel regions defined as regions where the common electrode 13 and each pixel electrode 14 (14a, 14b, 14c) overlap in a plan view, and these pixel regions are arranged in a matrix. In this embodiment, although the shape of each pixel region is a square, the shape of the pixel regions can be arbitrarily set, such as a mixture of rectangular shapes and squares, for example. The common electrode 13, the pixel electrodes 14 (14a, 14b, 14c), and the inter-pixel electrodes 15 (15a, 15b, 15c) are connected to the liquid crystal driving device 4 via the respective wiring parts 16 (16a, 16b, 16C), etc., and are statically driven.

Referring again to FIG. 3, the structure of each pixel electrode 14 (14a, 14b, 14c), each inter-pixel electrode 15 (15a, 15b, 15c), and each wiring part 16 (16a, 16b, 16C) will be described in detail. In the present embodiment, the pixel electrodes 14 (14a, 14b, 14c) are arranged in three rows along the Y direction (the vertical direction), and arbitrary numbers of the pixel electrodes 14 (14a, 14b, 14c) are arranged along the X direction (the horizontal direction). Here, with respect to each pixel electrode 14 (14a, 14b, 14c), in order from the top in the figure, the pixel electrode in the first row is referred to as pixel electrode 14a (the first pixel electrode), the pixel electrode in the second row is referred to as pixel electrode 14b (the second pixel electrode), and the pixel electrode in the third row is referred to as pixel electrode 14c (the third pixel electrode). Further, with respect to the inter-pixel electrode 15 (15a, 15b, 15c), the one corresponding to the pixel electrode 14a in the first row is referred to as inter-pixel electrode 15a, the one corresponding to the pixel electrode 14b in the second row is referred to as inter-pixel electrode 15b, and the one corresponding to the pixel electrode 14c in the third row is referred to as inter-pixel electrode 15c. Further, with respect to the wiring part 16 (16a, 16b, 16C), the one corresponding to the pixel electrode 14a and the inter-pixel electrode 15a in the first row is referred to as wiring part 16a (the first wiring part), the one corresponding to the pixel electrode 14b and the inter-pixel electrode 15b in the second row is referred to as wiring part 16b (the second wiring part), and the one corresponding to the pixel electrode 14c and the inter-pixel electrode 15c in the third row is referred to as wiring part 16c (the third wiring part).

Each pixel electrode 14a is connected to the inter-pixel electrode 15a and the wiring part 16a on the lower layer side via a through hole 19 provided in the insulating layer 17. Thus, the pixel electrode 14a, the inter-pixel electrode 15a, and the wiring part 16a have the same electrical potential. As shown in FIG. 3, each through hole 19 has a substantially triangular outer edge shape in a plan view, and corresponds to one of the four corners (top left corner in the figure) of each pixel electrode 14a. And each pixel electrode 14a has a connecting part 20a formed along the wall surface of the through hole 19. The connecting part 20a is connected to the inter-pixel electrode 15a and the portion of the wiring part 16a exposed at the bottom of the through hole 19 on the lower layer side.

Similarly, each pixel electrode 14b has a connecting part 20b formed along the wall surface of the through hole 19, and is connected to the inter-pixel electrode 15b and the wiring part 16b on the lower layer side. Thus, the pixel electrode 14b, the inter-pixel electrode 15b, and the wiring part 16b have the same electrical potential. Similarly, each pixel electrode 14c has a connecting part 20c formed along the wall surface of the through hole 19, and is connected to the inter-pixel electrode 15c and the wiring part 16c on the lower layer side. Thus, the pixel electrode 14c, the inter-pixel electrode 15c, and the wiring part 16c have the same electrical potential.

Each of the inter-pixel electrodes 15a is disposed so as to fill the space between the two adjacent pixel electrodes 14a in the X direction in a plan view. In the present embodiment, each of the inter-pixel electrodes 15a is disposed so that its own left outer edge in a plan view and the right outer edge of the pixel electrode 14a arranged on the left side thereof are substantially at the same position in the vertical direction.

Further, in a plan view, each of the inter-pixel electrodes 15a is disposed so that a partial region 115a (first region) located inward from its own right edge partly overlaps with a part of the region in the vicinity of the left outer edge of the pixel electrode 14a arranged on the right side thereof. In these partial regions 115a, an oblique electric field is prevented from occurring in the vicinity of the left outer edge of the pixel electrode 14a in the figure thereby achieving the effect of suppressing the occurrence of dark region. Thus, it is preferable that the length of each partial region 115a in the Y direction is set as long as possible, and thus, in the present embodiment, the length of the partial region 115a in the Y direction is set to be substantially the same as the length of the corresponding pixel electrode 14a in the Y direction.

Similarly, in a plan view, each of the inter-pixel electrodes 15b is disposed between two adjacent pixel electrodes 14b arranged in the X direction, and a partial region 115b (first region) partially overlaps with the pixel electrode 14b on the right side thereof. Similarly, in a plan view, each of the inter-pixel electrodes 15c is disposed between two adjacent pixel electrodes 14c arranged in the X direction, and a partial region 115c (first region) partially overlaps with the pixel electrode 14c on the right side thereof.

Here, in the figure, the lower end portions of the inter-pixel electrodes 15a, 15b, 15c are drawn so as to protrude slightly downward from the lower end portions of the respective pixel electrodes 14a, 14b, 14c, but the lower end portions may actually be aligned.

Each wiring part 16a is connected to one of the inter-pixel electrodes 15a and extends upward in the figure. In the present embodiment, each wiring part 16a is integrally formed with the corresponding inter-pixel electrode 15a sharing the same width. Each wiring part 16a is connected to the liquid crystal driving device 4.

Each wiring part 16b is connected to one of the inter-pixel electrodes 15b and extends upward in the figure. Each wiring part 16b is connected to the liquid crystal driving device 4. In the present embodiment, in a plan view, each wiring part 16b has: a partial region 116b (a second region) partially overlapping the pixel electrode 14b adjacent in the X direction with respect to the inter-pixel electrode 15b connected to the wiring part 16b; a partial region 216b (a third region) disposed between the pixel electrode 14b and the pixel electrode 14a adjacent thereto in the Y direction; and a partial region 316b overlapping with the pixel electrode 14a. The partial regions 116b, 216b, 316b are integrally formed.

Each partial region 116b of each wiring part 16b has an effect of suppressing the occurrence of a dark region near the upper outer edge of the pixel electrode 14b in the figure, similar to the partial region 115b described above. Thus, it is preferable that the width of each partial region 116b in the X direction is set as wide as possible, and it is preferable to have a width of 50% or more with respect to the width of the corresponding pixel electrodes 14a, 14b, for example. In the illustrated example, the width of each partial region 216b is about 70% of the width of the corresponding pixel electrodes 14a, 14b.

Each partial region 216b of each wiring part 16b also functions as an inter-pixel electrode arranged between the two adjacent pixel electrodes 14a and 14b in the Y direction. Thus, it is preferable that the X direction length of each partial region 216b is set as wide as possible, and it is preferable to have a length of 50% or more with respect to the length of the corresponding pixel electrodes 14a, 14b in the X direction, for example. In the illustrated example, the width of each partial region 216b is about 70% of the length of the corresponding pixel electrodes 14a, 14b in the X direction. By providing such a partial region 216b, it is possible to broaden a region that substantially functions as a pixel region.

Each wiring part 16c is connected to one of the inter-pixel electrodes 15c and extends upward in the figure. Each wiring part 16c is connected to the liquid crystal driving device 4. In the present embodiment, in a plan view, each wiring part 16c has: a partial region 116c (a second region) partially overlapping the pixel electrode 14c adjacent in the X direction with respect to the inter-pixel electrode 15c connected to the wiring part 16c; a partial region 216c (a third region) disposed between the pixel electrode 14c and the pixel electrode 14b adjacent thereto in the Y direction; a partial region 316c disposed to overlap with the pixel electrode 14b and interposing the insulating layer 17 therebetween; a partial region 416c disposed to overlap with the pixel electrode 14a adjacent to the pixel electrode 14b in the Y direction and interposing the insulating layer 17 therebetween; and a connection region 516c connecting the partial region 316c and the partial region 416c disposed between the pixel electrode 14a and the pixel electrode 14b. The partial regions 116c, 216c, 316c, 416c, and the connection region 516c are integrally formed.

Each partial region 116c of each wiring part 16c has an effect of suppressing the occurrence of a dark region near the upper outer edge of the pixel electrode 14c in the figure, similar to the partial region 115c described above. Thus, it is preferable that the length of each partial region 116c in the X direction is set as wide as possible, and for example, it is preferable to have a length of 50% or more with respect to the length of the corresponding pixel electrodes 14b, 14c in the X direction. In the illustrated example, the length of each partial region 116c is about 87% of the length of the corresponding pixel electrodes 14b, 14c in the X direction.

Each partial region 216c of each wiring part 16c also functions as an inter-pixel electrode arranged between the two adjacent pixel electrodes 14b, 14c in the Y direction. Thus, it is preferable that the length of each partial region 216c in the X direction is set as wide as possible, and it is preferable to have a length of 50% or more with respect to the length of the corresponding pixel electrodes 14b, 14c in the X direction, for example. In the illustrated example, the length of each partial region 216c is about 87% of the length of the corresponding pixel electrodes 14b, 14c in the X direction. By providing such a partial region 216c, it is possible to widen a region that substantially functions as a pixel region.

Here, assuming that each of the columnar spacers 31 described above does not exist, when a voltage is applied to the pixel electrode 14c to render the region into a light transmissive state, since the same voltage is applied to the connection region 516c, the connection region 516c also becomes a light transmissive state. At this time, for example, if each region corresponding to the pixel electrode 14a or the pixel electrode 14b is in a non-transmissive state (or a low-transmissive state), the light transmissive state of the connection region 516c can be visually recognized as a bright spot. Therefore, by providing each columnar spacer 31 in association with each connection region 516c, it is possible to turn into a state where the liquid crystal molecules (liquid crystal layer 18) do not exist in the portion corresponding to each connection region 516c, thereby avoiding generation of bright spots as described above. Here, although each connection region 516c is always in a non-transmissive state and can be visually recognized as a black spot, since a black spot is less noticeable due to the characteristics of human eyes, a black spot is considered to be more preferable than a bright spot. Further, as illustrated in the figure, since the connection region 516c exists for electrically connecting the partial region 316c and the partial region 416c, it can be formed in a relatively narrow size. Thus, it is possible to create a state where the black spots are substantially invisible.

Figure 4:
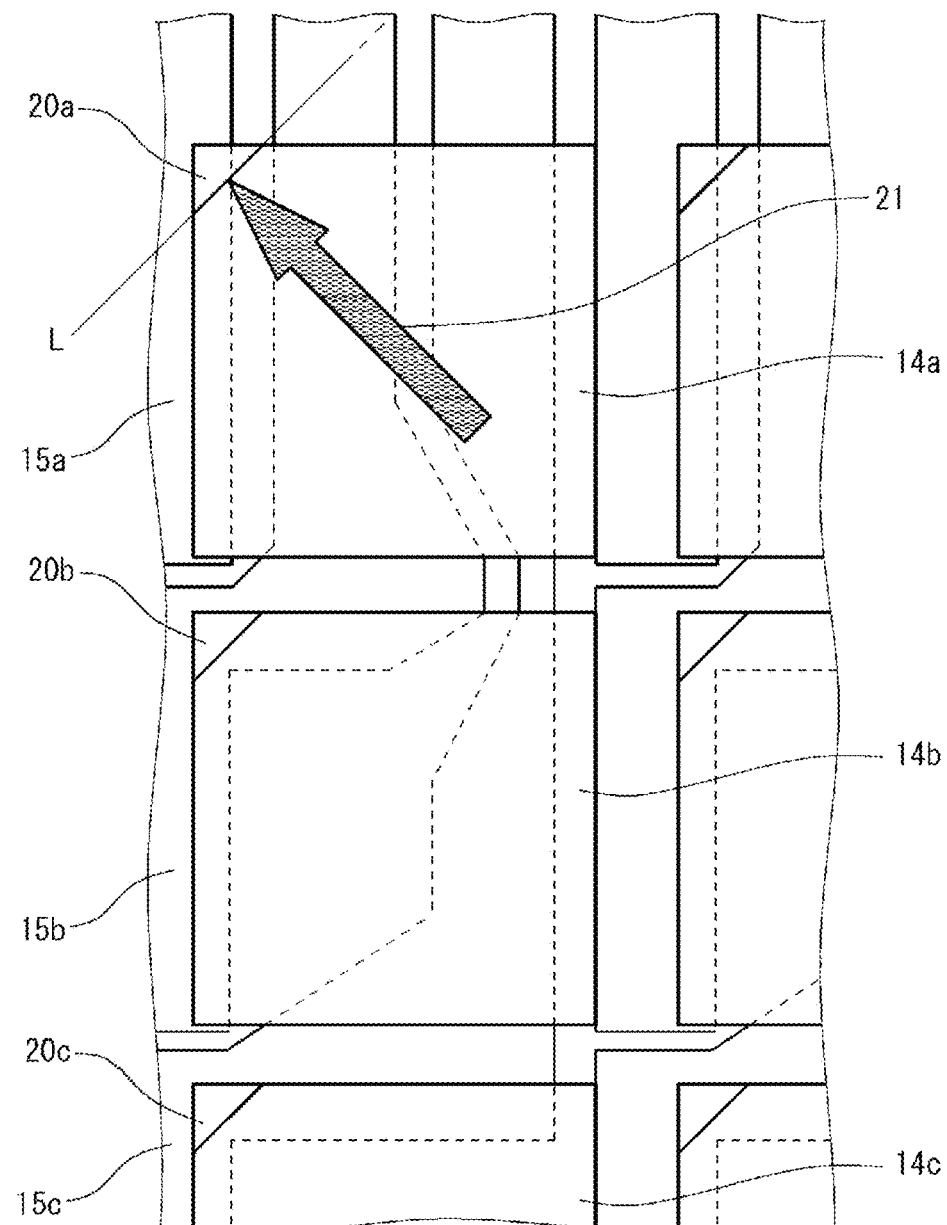
FIG. 4 is a diagram for explaining the relationship between the shape of the connecting part of each pixel electrode and the direction of alignment treatment.

FIG. 4 is a diagram for explaining the relationship between the shape of the connecting part of each pixel electrode and the direction of alignment treatment. Similar to FIG. 3, each pixel electrode, etc. is shown in a plan view in FIG. 4. Here, alignment treatment is defined as a treatment (uniaxial alignment treatment) for imparting alignment regulating force (uniaxial alignment regulating force) in one direction to an alignment film, such as a rubbing treatment or a photo aligning treatment. And the direction of alignment treatment is defined as the direction when performing the above-described alignment treatment, and in general, coincides with the direction in which the uniaxial alignment regulating force is generated. As described above, the through hole 19 in which the connecting part 20a of each pixel electrode 14a is provided has a substantially triangular outer edge. In the present embodiment, the direction L of the outer edge of the connecting part 20a disposed to intersect with both the left outer edge and the upper outer edge of the pixel electrode 14a forms an angle of approximately 45 degrees with respect to both the X and Y directions. The direction of alignment treatment 21 intersects (substantially orthogonal in the present embodiment) with respect to the direction L of the outer edge, and is set from the inside of the pixel electrode 14a toward the outer edge of the connecting part 20a. Here, the relationship between each of the connecting parts 20b, 20c of each of the pixel electrode 14b and pixel electrode 14c and the direction of alignment treatment 21 is the same as above. The reason why it is preferable to set the direction of alignment treatment 21 as such will now be described.

Figure 5A:
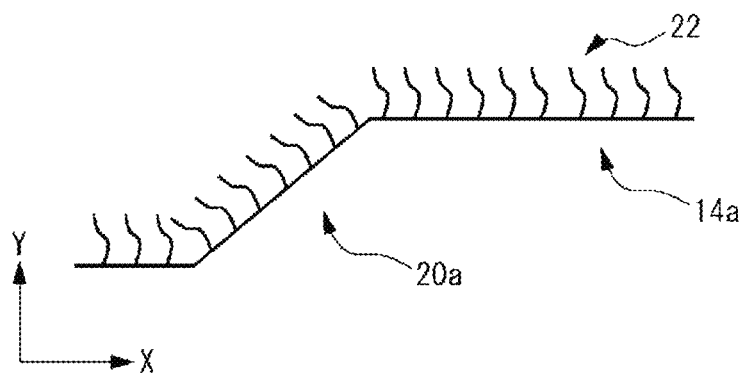
FIGS. 5A to 5C are diagrams for explaining the relationship between each connecting part and the direction of alignment treatment.
Figure 5B:
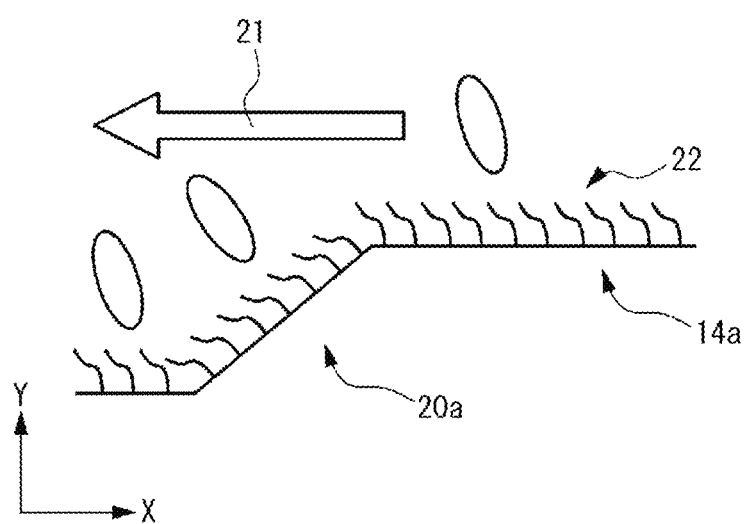
Figure 5C:
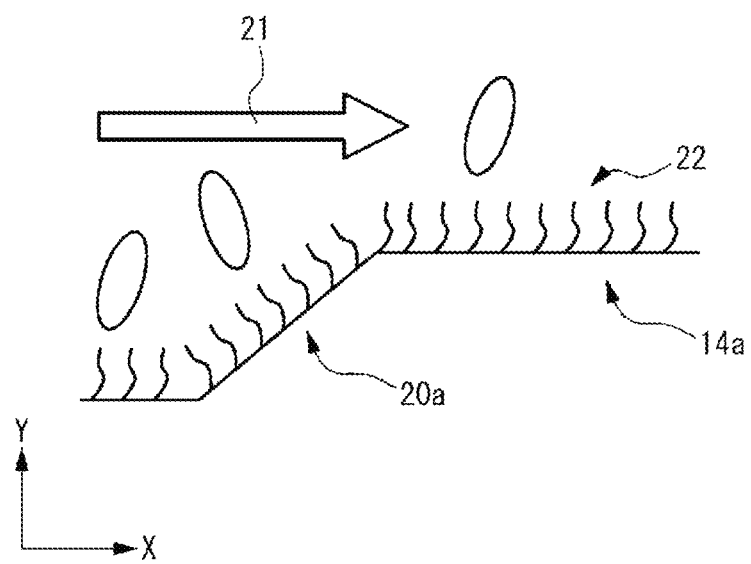

FIGS. 5A to 5C are diagrams for explaining the relationship between each connecting part and the direction of alignment treatment. The state of the alignment film on the connecting part of each pixel electrode and the surface in the vicinity thereof is schematically shown. FIG. 5A shows the state before the alignment treatment is being performed. As shown in the figure, for example, in the connecting part 20a and the vicinity thereof, side chains 22 of the alignment film rise upward from the surface. At this time, since the rising direction of the side chains 22 changes according to the surface configuration, the side chains 22 rise upward from the sloped surface area along the through hole 19 of the connecting part 20a.

FIG. 5B shows the state of the alignment film when alignment treatment (rubbing treatment) is performed by setting the direction of alignment treatment 21 to the preferable state as shown in FIG. 4. In this case, since the alignment treatment is performed in the direction from the right to the left in the figure, the side chains 22 also tilt somewhat in that direction. Here, when viewing the Y direction in the figure as the reference direction (the vertical direction), since the side chains 22 are inclined to the left side in the figure throughout the whole region, the alignment direction of the liquid layer molecules controlled by the side chains 22 is also inclined to the left side in the figure. Thus, occurrence of a disclination line in the vicinity of the connecting part 20a can be prevented.

FIG. 5C is a comparative example showing the state of the alignment film when alignment treatment (rubbing treatment) is performed by setting the direction of alignment treatment 21 in the direction opposite to the preferable state shown in FIG. 4. In this case, since the alignment treatment is performed in the direction from the left to the right in the figure, the side chains 22 also tilt somewhat in that direction. Here, when viewing the Y direction in the figure as the reference direction (the vertical direction), the side chains 22 are inclined to the right in the figure in the flat surface portion of the pixel electrode 14a, whereas in the sloped surface portion of the connecting part 20a, the side chains remain inclined to the left side in the figure. Thus, the alignment direction of the liquid crystal molecules is reversed in the vicinity of the connecting part 20a and its periphery, and a disclination line is formed at the boundary. The occurrence of such a disclination line leads to deterioration of the quality of the formed light distribution pattern.

Figure 6:
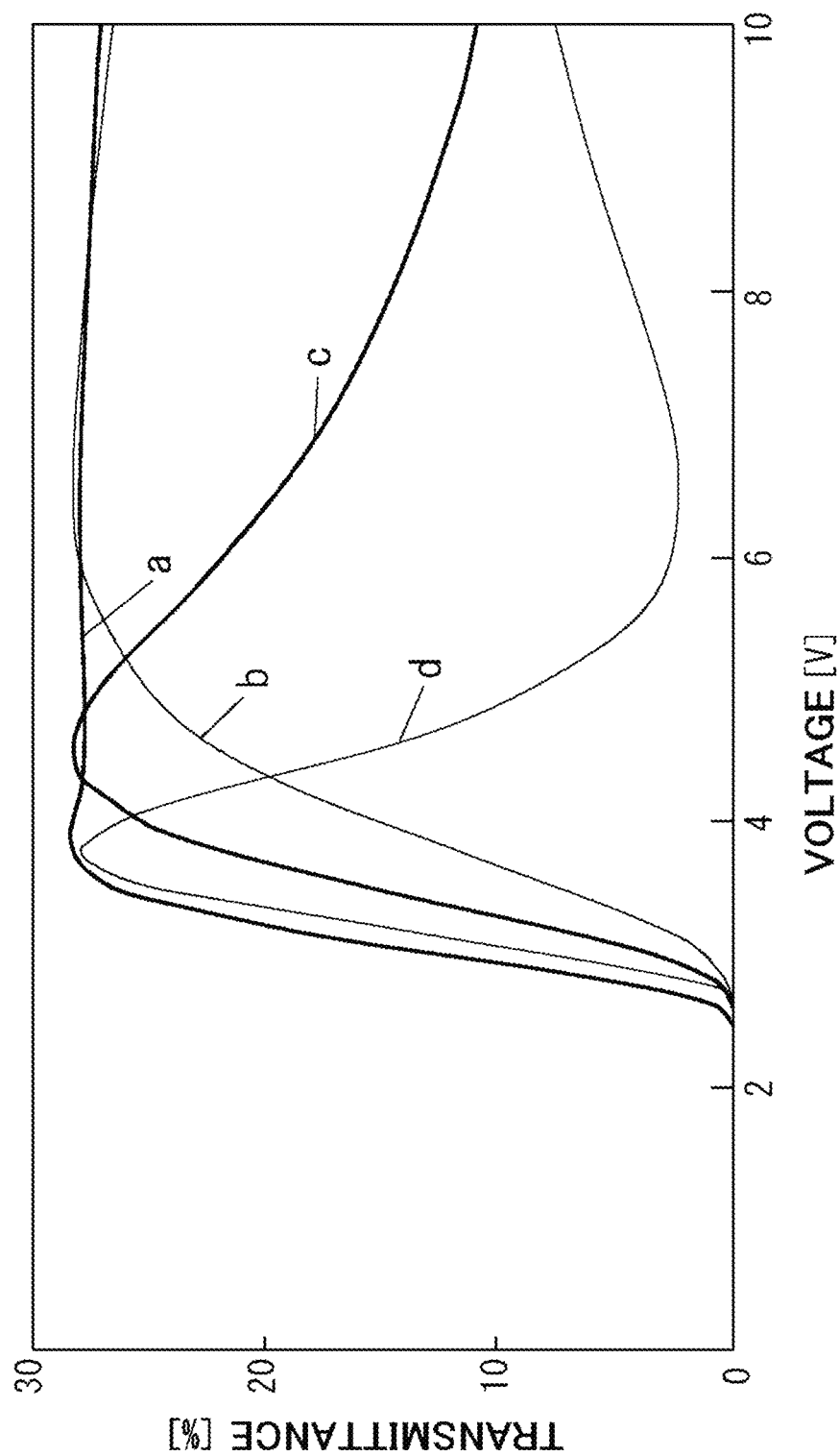
FIG. 6 is a graph showing the transmittance characteristics of several samples of the liquid crystal element.

FIG. 6 is a graph showing the transmittance characteristics of several samples of the liquid crystal element. Here, the transmittance characteristics of several samples of the liquid crystal elements were measured where conditions other than the cell thickness and the presence or absence of the addition of chiral material to the liquid material were made common, and the pair of polarizers were arranged and prepared as described above. Regarding the vertical alignment film, one having a rigid skeleton (liquid crystal type) in its side chain was used where the thickness was made to about 500 to 800 Å by flexographic printing, and baked at 160 to 250° C. for 1 to 1.5 hours. Regarding rubbing treatment, the indentation amount was set to 0.3 to 0.8 mm and the direction was set to anti-parallel. Regarding the liquid crystal material, one having a dielectric anisotropy $\Delta\varepsilon$ of −4.4 and a refractive index anisotropy $\Delta n$ of approximately 0.13 was used.

Figure 7A:
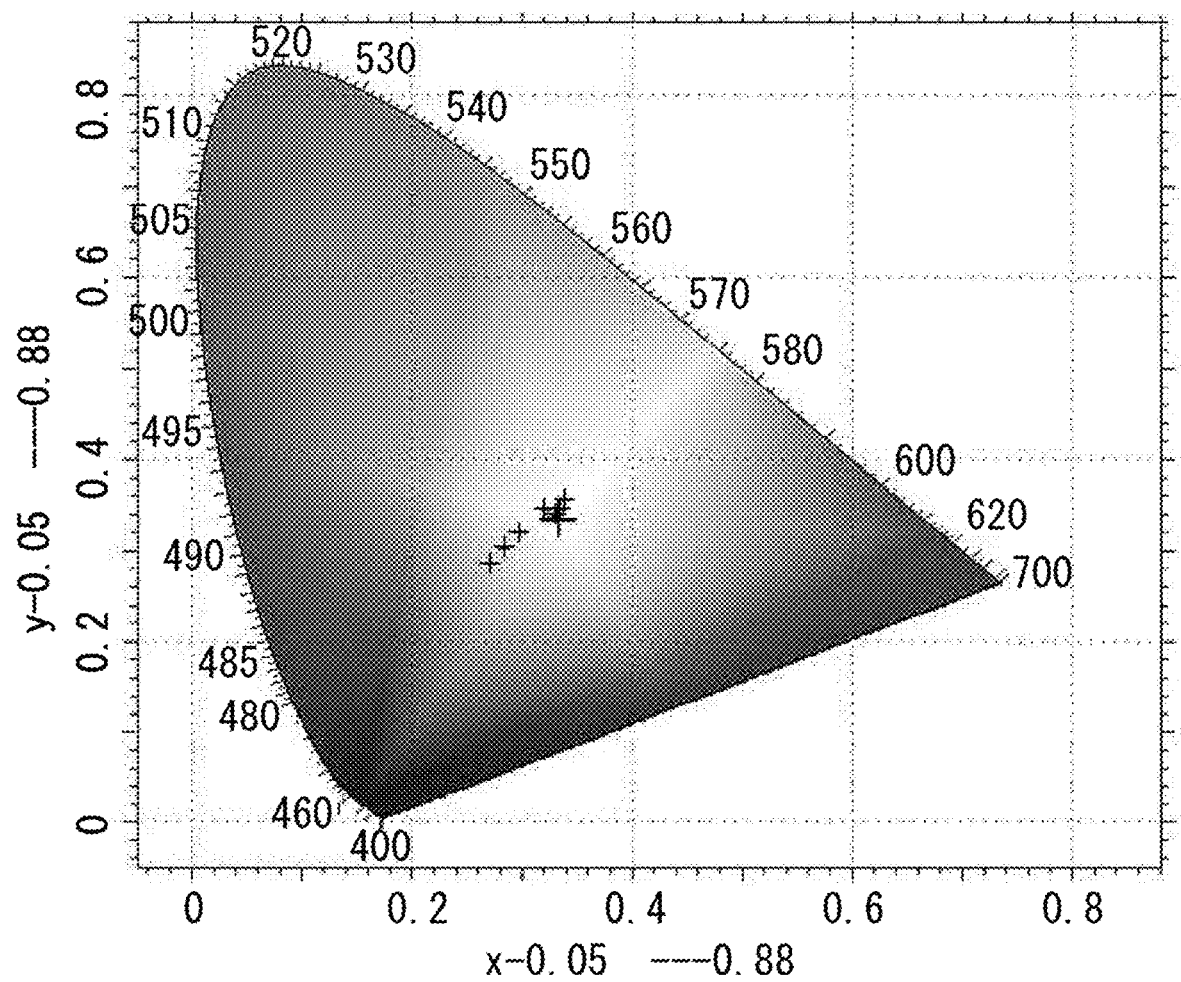
FIGS. 7A and 7B are diagrams showing changes in chromaticity of each element.
Figure 7B:
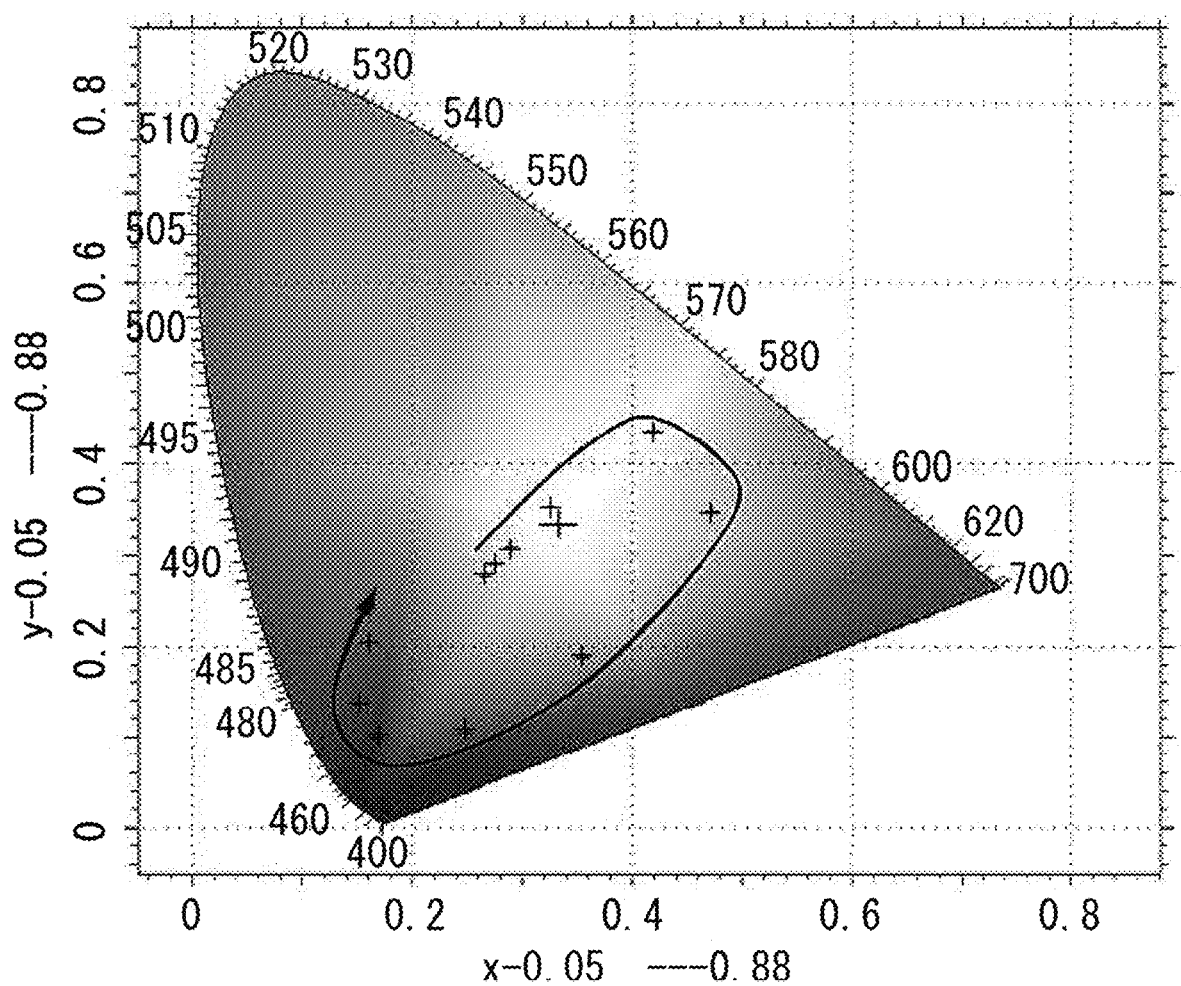

In FIG. 6, characteristic line a indicates the characteristic of a liquid crystal element sample where the cell thickness is 6 μm and chiral material is added (hereinafter referred to as element a), characteristic line b indicates the characteristic of a liquid crystal element sample where the cell thickness is 3 μm and chiral material is not added (hereinafter referred to as element b), characteristic line c indicates the characteristic of a liquid crystal element sample where the cell thickness is 4 μm and chiral material is not added (hereinafter referred to as element c), and characteristic line d indicates the characteristic of a liquid crystal element sample where the cell thickness is 6 μm and chiral material is not added (hereinafter referred to as element d). In element a of characteristic line a and element b of characteristic line b, the transmittance does not decrease and is substantially constant even when the applied voltage becomes high. On the other hand, in element c of characteristic line c, the transmittance once increased as the applied voltage increases gradually decreases as the applied voltage further increases. Further, in element d of characteristic line d, the transmittance is saturated at an applied voltage of about 3.8V, and the transmittance rapidly decreases as the voltage becomes higher than 3.8V. FIGS. 7A and 7B are diagrams showing changes in chromaticity of element a and element d, respectively. In element a, the chromaticity hardly changes irrespective of the voltage change, but in element d, the chromaticity changes largely. Here, element b also had a similar result as element a.

Here, in the liquid crystal element 5 of the present embodiment, the effective voltage applied to the liquid crystal layer 18 from the region in which voltage is applied from the respective pixel electrodes 14 (14a, 14b, 14c) toward the liquid crystal layer 18 (defined as the "first region", hereinafter the same) and the region in which voltage is applied from the inter-pixel electrode 15 to the liquid crystal layer 18 (defined as the "second region", hereinafter the same) are different. This is due to the difference in the presence or absence of the insulating layer 17. That is, in the second region, since the insulating layer 17 is interposed between the inter-pixel electrode 15 and the liquid crystal layer 18, the applied voltage is divided by the insulating layer 17 and the liquid crystal layer 18. Thus, as for the liquid crystal element 5, it is desirable to use element a or element b shown in FIG. 6 where the range in which the transmittance can be regarded as substantially constant with respect to the applied voltage is wider, and to set a relatively high applied voltage (for example, a voltage 1.5 times or more than a threshold value). Thereby, necessary and sufficient voltage is applied to both the first region and the second region. The phrase "range in which the transmittance can be regarded as substantially constant" as referred to herein means a range where the transmittance variation falls within ±3%, for example. Thereby, it is possible to reduce G value which is the index indicating the gradient of the bright/dark boundary line (light intensity change).

Here, the G value is defined by the following equation (refer to Japanese Unexamined Patent Application Publication No. 2017-206094).

$$G = \text{Log}(E_\beta - E_{\beta+0.1°})$$

Here, $E_\beta$ is the light intensity value at the angular position β.

The G value, in the case of the prior art for example, is about 5.7 (when the distance between the pixel electrodes is 20 μm), but in the present embodiment, the G value can be made smaller. The G value is preferably 1 or less.

The difference in the effective applied voltages between the above-described first region and the second region will now be examined. The second region can be regarded as connecting the capacitance component of the liquid crystal layer 18 and the capacitance component of the insulating layer 17 in series. That is, the second region can be regarded as a series connection of two capacitors.

The capacitance component $C_{LC}$ of the liquid crystal layer 18 can be expressed as follows, where the dielectric constant (short axis direction) of the liquid crystal material is defined as $\varepsilon_{LC}$, the area of the region is defined as S, and the layer thickness of the liquid crystal layer 18 is defined as $d_{LC}$. Likewise, the capacitance component $C_{top}$ of the insulating layer 17 can be expressed as follows, where the dielectric constant of the insulating layer 17 is defined as $\varepsilon_{top}$, the area of the region is defined as S, and the layer thickness of the insulating layer 17 is defined as $d_{top}$.

$$C_{LC}=\varepsilon_{LC}\times S/d_{LC}$$

$$C_{top}=\varepsilon_{top}\times S/d_{top}$$

Since the capacitors are connected in series and the electric charge amount Q is the same between the two, the electric charge amount Q can be expressed as follows, where the voltage applied to the liquid crystal layer 18 is defined as $V_{LC}$ and the voltage applied to the insulating layer 17 is defined as $V_{top}$.

$$Q=C_{LC}\times V_{LC}$$

$$Q=C_{top}\times V_{top}$$

For example, in a liquid crystal element having a cell thickness of 6 μm, when $d_{LC}$ and $\varepsilon c$ of the liquid crystal layer 18 are 5 μm and 8.0, respectively, and $d_{top}$ and $\varepsilon_{top}$ of the insulating layer 17 are 1 μm and 3.44, respectively, each capacitance component is expressed as follows.

$$C_{LC}=8.0\times S/5=1.6\times S$$

$$C_{top}=3.44\times S/1=3.44\times S$$

Then, the following is derived.

$$V_{LC}:V_{top}=1/C_{LC}:1/C_{top}=1/1.6:1/3.44$$

Further, the following is derived.

$$V_{LC}:V_{top}=1.96:1$$

From the above numerical example, the divided voltage ratio of the liquid crystal layer 18 and the insulating layer 17 is 1.96:1 which is approximately 2:1. That is, since the insulating layer 17 does not exist in the first region where the voltage is applied to the liquid crystal layer 18 from each pixel electrode 14, the applied voltage basically remains unchanged. However, in the second region where the voltage is applied from the inter-pixel electrode 15, the voltage obtained by dividing the applied voltage by 2:1 is applied to the liquid crystal layer 18. Therefore, in order to prevent a difference in transmittance between the first region and the second region, as described above, it is desirable to use a liquid crystal element having a wide range in which the transmittance can be regarded as substantially constant for the liquid crystal element 5, and to apply a relatively high voltage. For example, when using the liquid crystal element of the characteristic line a (element a) shown in FIG. 6, if the applied voltage is set to 7 V, then 7 V is applied to the first region of the liquid crystal layer 18 and the divided voltage of about 4.7 V is applied to the second region, thereby similar transmittance can be obtained in both regions.

In other words, it is preferable to configure the liquid crystal element 5 so as to have a transmittance characteristic such that the transmittance due to the voltage divided by the insulating layer 17 and applied to the liquid crystal layer 18 and the transmittance due to the voltage without being divided by the insulating layer 17 and applied to the liquid crystal layer 18 are substantially equal (within a variation range of ±3%, for example).

Figure 8:
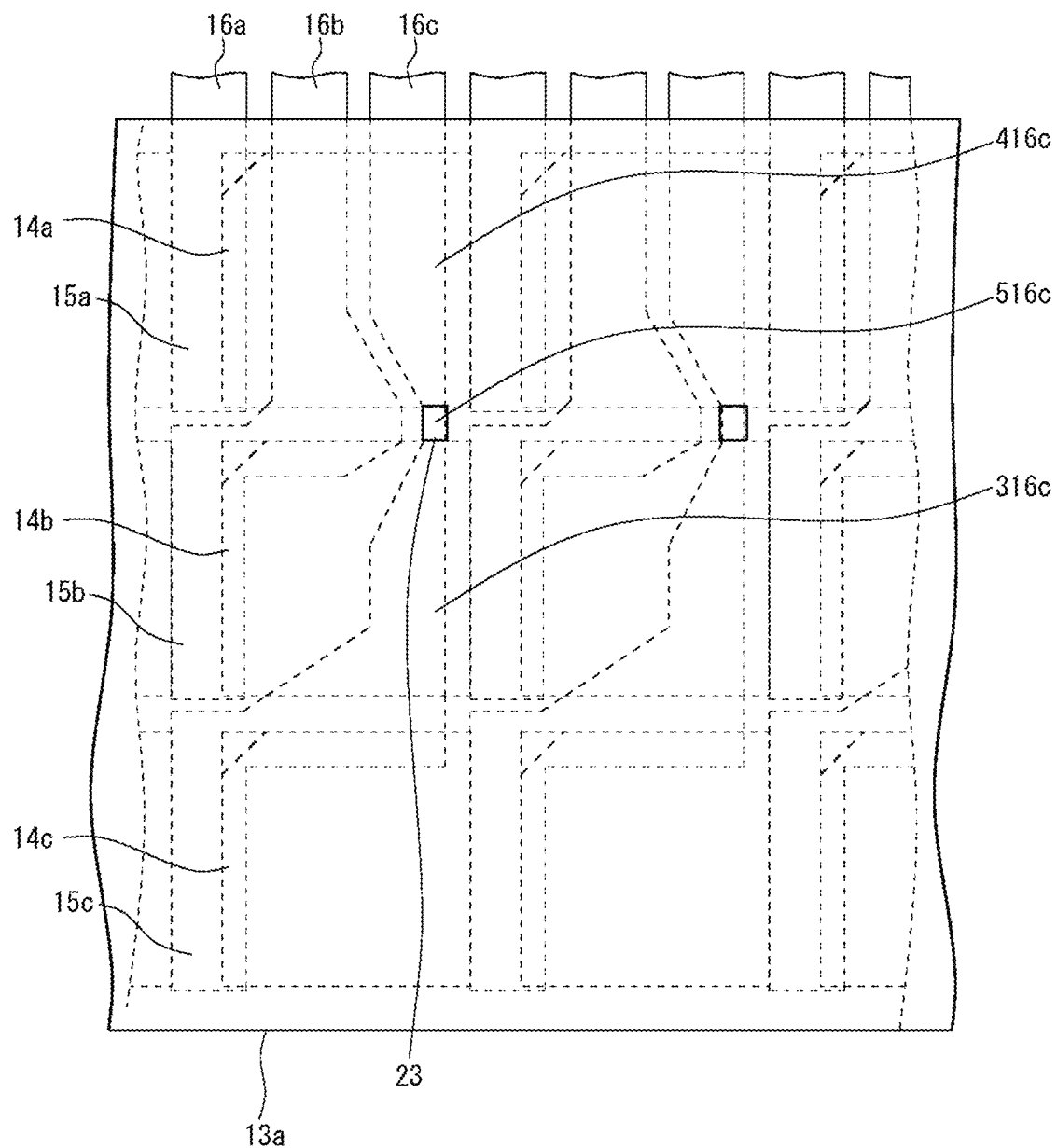
FIG. 8 is a plan view for explaining a modification example of the common electrode.

FIG. 8 is a plan view for explaining a modification example of the common electrode. In FIG. 8, the common electrode 13 is superimposed on each of the pixel electrodes 14a, etc. In the illustrated common electrode 13a, openings 23 are provided in regions corresponding to the connection regions 516c of the respective wiring parts 16c. Although it is preferable that the shape and size of the opening 23 in a plan view be substantially similar to that of the connection region 516c, in consideration of manufacturing accuracy limitation and to allow some margin for positioning, the opening 23 may be made somewhat larger than the connection region 516c so that the connection region 516c is internally included in the opening 23 in a plan view. By providing such openings 23, unnecessary light transmission in the connection regions 516c can be prevented. In this case, the columnar spacer 31 provided in association with the connection region 516c in the above-described embodiment may be omitted or used in combination with the opening 23.

In detail, if each of the openings 23 is not provided, when voltage is applied to the pixel electrode 14c and the region is brought into a light transmitting state, since same voltage is also applied to each of the connecting regions 516c, each of the connecting regions 516c also becomes a light transmitting state. Here, if each region corresponding to the pixel electrode 14a and the pixel electrode 14b is in a non-transmissive state (or a low transmissive state), then it is conceivable that the light transmitting state of each of the connecting regions 516c can be visually recognized as a bright spot. By providing the openings 23, occurrence of such bright spot can be avoided. Now, since the connection regions 516c are constantly in the non-transmissive state, each of the regions can be visually recognized as a black spot, but since a black spot is less conspicuous than a bright spot considering the characteristics of human eyes, it can be said that having black spots is more preferable than having bright spots. Further, as shown in the figure, since each connection region 516c exists for the purpose of electrically connecting the partial region 316c and the partial region 416c, it can be formed in a relatively small size. Therefore, it is possible to make the black spots hardly visible.

Figure 9:
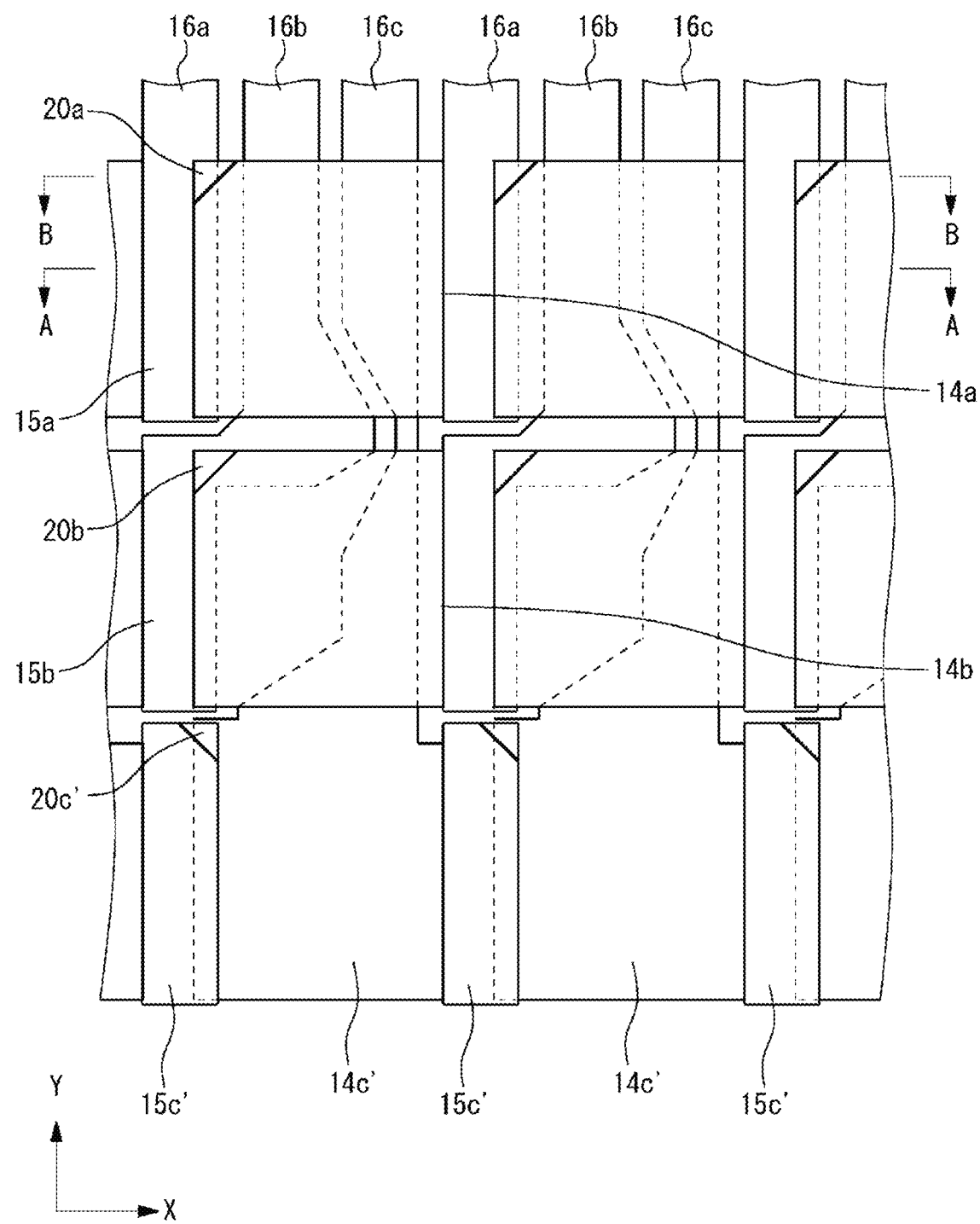
FIG. 9 is a plan view for explaining a modified embodiment of the pixel electrodes and the inter-pixel electrodes.

FIG. 9 is a plan view for explaining a modified embodiment of the pixel electrodes and the inter-pixel electrodes. In the illustrated example, in the third row, the vertical arrangement of the pixel electrodes and the inter-pixel electrodes is inverted, which is different from the above-described embodiment. Specifically, the pixel electrodes 14c' are provided on the lower layer side and the insulating layer 17 is provided so as to cover them (refer to FIGS. 2A to 2C), and the inter-pixel electrodes 15c' are provided on the upper side of the insulating layer 17. Each inter-pixel electrode 15c' is provided with a connecting part 20c', and each inter-pixel electrode 15c' and each pixel electrode 14c' are connected via the connecting part 20c'. Each wiring part 16c is connected to each pixel electrode 14c'. As in this example, it is possible to invert the vertical arrangement of the pixel electrodes and the inter-pixel electrodes.

Figure 10:
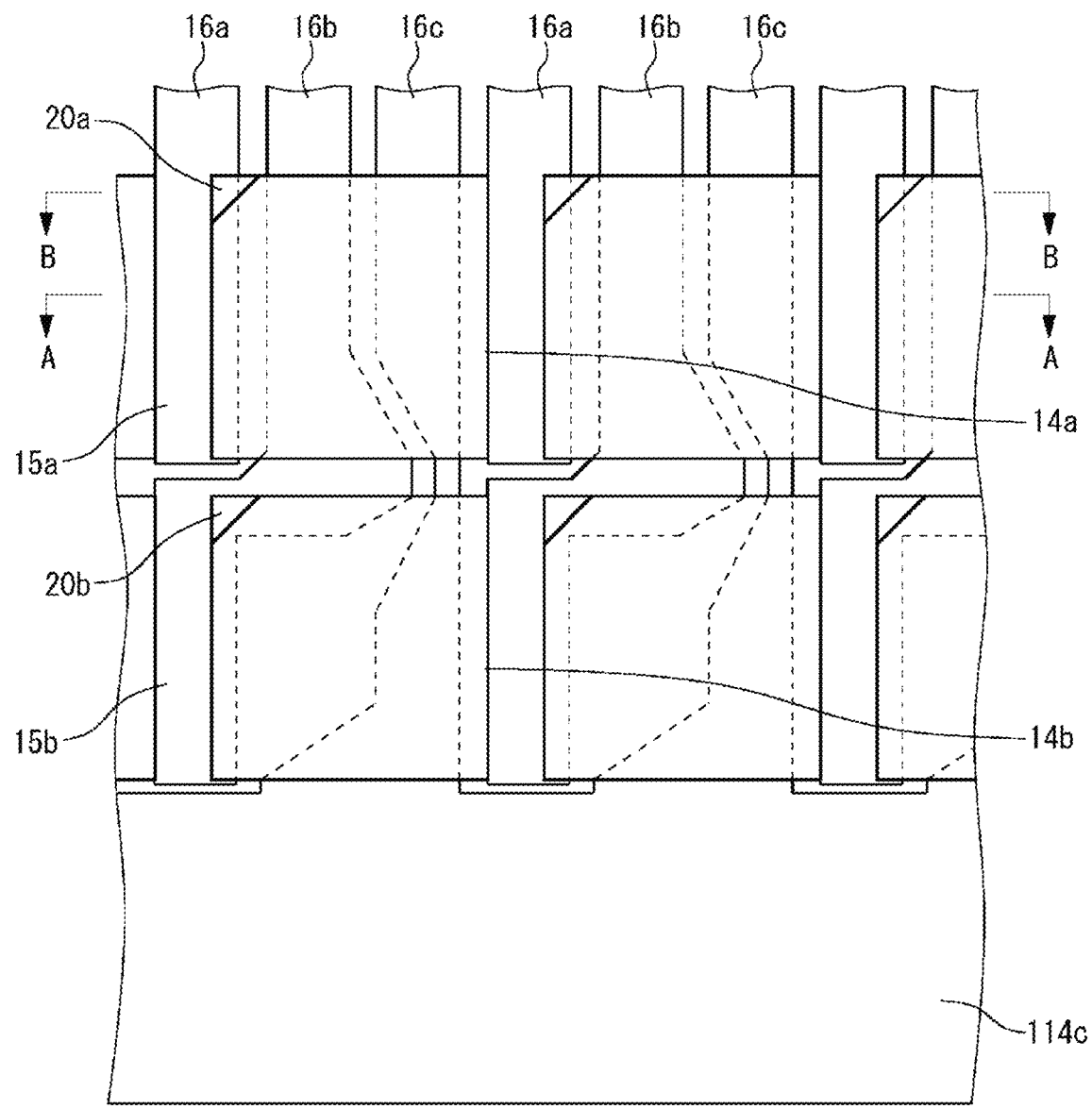
FIG. 10 is a plan view for explaining a modified embodiment of the pixel electrodes.

FIG. 10 is a plan view for explaining a modified embodiment of the pixel electrodes. In the illustrated example, in the third row, the pixel electrodes 114c are all integrated and provided below the insulating layer 17 which is different from the above-described embodiment. As in this example, a part of pixel electrodes may be integrated with the other.

Here, although the illustrated example provides a plurality of wiring parts 16c, a minimum of one wiring part 16c connected to the pixel electrode 114c may be sufficient. Then, the region capable of functioning as a pixel region can be further expanded.

According to each of the embodiments as described above, it is possible to improve the appearance of a light distribution pattern in a vehicular lamp system that controls the light distribution pattern using liquid crystal elements or the like. In particular, it is possible to prevent a bright spot that corresponds to the partial region of the wiring part disposed between the pixel electrodes from being generated, and thus the appearance is further improved.

It should be noted that this invention is not limited to the subject matter of the foregoing embodiment, and can be implemented by being variously modified within the scope of the present invention as defined by the appended claims. For example, in the above-described embodiments, the liquid crystal layer of the liquid crystal element is described as being vertically aligned, but the configuration of the liquid crystal layer is not limited thereto, and other structures (for example, TN alignment) may be implemented. Further, a viewing angle compensating plate may be disposed between the liquid crystal element and the polarizer.

Further, the above-stated embodiments describe examples in which the present invention is applied to a system that selectively irradiates light in front of a vehicle, but the scope of the present invention is not limited thereto. For example, the present invention may be applied to a system that irradiates light to the obliquely forward direction of the vehicle according to the traveling direction of the vehicle, or a system that adjusts the optical axis of the headlamp according to the inclination in the longitudinal direction of the vehicle, or a system that electronically adjusts the high beam and the low beam of the headlamp or the like. Furthermore, the present invention may be applied not only to vehicular applications but also to general lighting apparatuses.

Further, in the above-described embodiments, the generation of bright spots is prevented by providing the columnar spacers 30 or the openings 23, but a light shielding film may be provided instead of or in combination with these. In this case, for example, various types of light shielding films such as a light-absorbing film, an optical multilayer film, and a combination of a metal film and an insulating film can be used.

What is claimed is:

1. A liquid crystal element comprising:
a first substrate and a second substrate disposed facing each other;
a liquid crystal layer disposed between the first substrate and the second substrate; and
a plurality of columnar bodies arranged between the first substrate and the second substrate and disposed in the liquid crystal layer;
wherein the first substrate has a counter electrode provided on its one surface side;
wherein the second substrate is configured to include a plurality of wiring parts provided on its one surface side, an insulating layer provided on the upper side of the plurality of wiring parts, and a plurality of pixel electrodes provided on the upper side of the insulating layer,
wherein the plurality of pixel electrodes is arranged at least along a first direction in a plan view,
wherein each of the plurality of wiring parts is connected to one of the plurality of pixel electrodes and arranged on the lower layer side of the plurality of pixel electrodes,
wherein the plurality of pixel electrodes is configured to include at least a first pixel electrode arranged along the first direction, a second pixel electrode adjacent to the first pixel electrode, and a third pixel electrode adjacent to the second pixel electrode, wherein the liquid crystal element further comprises a plurality of inter-pixel electrodes where each of the plurality of pixel electrodes corresponds to a different inter-pixel electrode,
wherein the plurality of wiring parts is configured to include a first wiring part connected to the first pixel electrode, a second wiring part connected to the second pixel electrode, and a third wiring part connected to the third pixel electrode,
wherein a first inter-pixel electrode is integrally formed with the first wiring part and is electrically connected to the first pixel electrode, all of which have the same electrical potential,
wherein a second inter-pixel electrode is integrally formed with the second wiring part and is electrically connected to the second pixel electrode, all of which have the same electrical potential,
wherein a third inter-pixel electrode is integrally formed with the third wiring part and is electrically connected to the third pixel electrode, all of which have the same electrical potential,
wherein the third wiring part is configured to include a connection region disposed between the first pixel electrode and the second pixel electrode in a plan view, wherein the connection region in the third wiring part electrically connects a first partial region of the third wiring part and a second partial region of the third wiring part,
wherein the second partial region of the third wiring part is arranged so as to overlap the first pixel electrode and the first partial region of the third wiring part is arranged so as to overlap the second pixel electrode in the plan view,
wherein the connection region of the third wiring part has the same electrical potential as the third pixel electrode which is connected to the third wiring part, and
wherein the plurality of columnar bodies overlaps all of the connection region in a plan view.

2. The liquid crystal element according to claim 1, wherein the plurality of columnar bodies is larger in width than the connection region in the first direction and/or in a second direction whose direction is different from the first direction.

3. The liquid crystal element according to claim 2, wherein the plurality of columnar bodies is a resin film having translucency or light shielding properties.

4. The liquid crystal element according to claim 1, wherein the plurality of columnar bodies is a resin film having translucency or light shielding properties.

5. A lighting apparatus, comprising:
a light source,
a liquid crystal element for forming an image using light from the light source, and
an optical system for projecting the image formed by the liquid crystal element,
wherein a liquid crystal element according to claim 1 is used as the liquid crystal element.

6. The lighting apparatus according to claim 5, further comprising:

a liquid crystal driving device for supplying a driving voltage to the liquid crystal element to individually control an alignment state of the liquid crystal layer in each pixel region formed between the counter electrode and each of the plurality of pixel electrodes in the liquid crystal element.

7. The lighting apparatus according to claim 6, further comprising:

a control device which detects the position of another vehicle or a pedestrian based on information surrounding a vehicle, wherein the liquid crystal driving device supplies the driving voltage to the liquid crystal element based on a control signal supplied from the control device.

8. The lighting apparatus according to claim 7, wherein the control device is further configured to detect the position of the other vehicle or the pedestrian based on the information in front of the vehicle, set a light distribution pattern where a predetermined region including the detected position of the other vehicle or the pedestrian is set as a non-irradiation region and the remaining region is set as a light irradiation region, and generate a control signal for forming the image corresponding to the light distribution pattern and supplies the control signal to the liquid crystal driving device, wherein the optical system projects the image which is formed by the liquid crystal element to the front of the vehicle.

9. The lighting apparatus according to claim 5, wherein the liquid crystal element further comprises the plurality of inter-pixel electrodes arranged so as to overlap a gap between the plurality of pixel electrodes in the plan view, and wherein each of the plurality of inter-pixel electrodes is arranged such that a partial region thereof overlaps a partial region of one of the plurality of pixel electrodes adjacent in a second direction which is substantially orthogonal to the first direction in the plan view.

10. The liquid crystal element according to claim 1, further comprising:

the plurality of inter-pixel electrodes arranged so as to overlap a gap between the plurality of pixel electrodes in the plan view, wherein each of the plurality of inter-pixel electrodes is arranged such that a partial region thereof overlaps a partial region of one of the plurality of pixel electrodes adjacent in a second direction which is substantially orthogonal to the first direction in the plan view.

\* \* \* \* \*